US011551581B2

(12) United States Patent
Chang et al.

(10) Patent No.: US 11,551,581 B2
(45) Date of Patent: Jan. 10, 2023

(54) AUTOMATIC INJECTION TRAINING DEVICE

(71) Applicant: SHL MEDICAL AG, Zug (CH)

(72) Inventors: Wen-An Chang, Taoyuan (TW); Yun-Hsuan Chang, Bade (TW)

(73) Assignee: SHL MEDICAL AG, Zug (CH)

( * ) Notice: Subject to any disclaimer, the term of this patent is extended or adjusted under 35 U.S.C. 154(b) by 0 days.

(21) Appl. No.: 17/378,265

(22) Filed: Jul. 16, 2021

(65) Prior Publication Data

US 2021/0343187 A1 Nov. 4, 2021

Related U.S. Application Data

(63) Continuation of application No. 16/083,006, filed as application No. PCT/EP2017/051386 on Jan. 24, 2017, now Pat. No. 11,107,369.

(30) Foreign Application Priority Data

Mar. 7, 2016 (SE) .................................... 1650306-2

(51) Int. Cl.
*G09B 23/28* (2006.01)
(52) U.S. Cl.
CPC .................................. *G09B 23/285* (2013.01)
(58) Field of Classification Search
CPC ................................................... G09B 23/285
See application file for complete search history.

(56) References Cited

U.S. PATENT DOCUMENTS

| 4,640,686 A | 2/1987 | Dalling et al. |
| 5,071,535 A | 12/1991 | Hartig et al. |

(Continued)

FOREIGN PATENT DOCUMENTS

| TW | I505848 B | 11/2015 |
| TW | M511868 U | 11/2015 |

(Continued)

OTHER PUBLICATIONS

Search Report issued in Taiwanese Patent Application No. 106104139 dated Oct. 11, 2018.

*Primary Examiner* — Nathan Hillery
(74) *Attorney, Agent, or Firm* — McDonnell Boehnen Hulbert & Berghoff LLP (57) ABSTRACT

The present invention relates to an automatic injection training device comprising an elongated housing having a distal end and an opposite proximal end and extending along a longitudinally axis (L); a tubular demo container axially and rotationally fixed relative to the elongated housing and having a tubular wall extending along the longitudinally axis (L); a reloadable plunger assembly comprising a plunger rod which is movable in the demo container between a first and a second position and a first energy accumulating element configured to move the plunger rod from the first to the second position; an actuation assembly configured to hold the plunger rod in the first position and to release the plunger rod from the first position. The invention is characterized in that the device further comprises a first signal generating element releasably connected to the plunger rod and a second signal generating element fixedly connected to the plunger rod, and wherein each signal generating element is configured to interact independently from each other for generating audible feedback signals.

20 Claims, 11 Drawing Sheets

(56) References Cited

U.S. PATENT DOCUMENTS

| | | |
|---|---|---|
| 2012/0109072 A1 | 5/2012 | Tabata et al. |
| 2012/0123350 A1 | 5/2012 | Giambattista et al. |
| 2013/0041347 A1 | 2/2013 | Daniel |
| 2013/0096512 A1 | 4/2013 | Ekman et al. |
| 2013/0102971 A1 | 4/2013 | Olson |
| 2013/0138049 A1 | 5/2013 | Kemp et al. |
| 2013/0150800 A1 | 6/2013 | Kemp et al. |
| 2013/0150801 A1 | 6/2013 | Ekman et al. |
| 2013/0172822 A1 | 7/2013 | Ekman et al. |
| 2013/0236872 A1 | 9/2013 | Laurusonis et al. |
| 2013/0274668 A1 | 10/2013 | Barrow-Williams et al. |
| 2013/0281929 A1 | 10/2013 | Jennings et al. |
| 2013/0317446 A1 | 11/2013 | Hourmand et al. |
| 2014/0114247 A1 | 4/2014 | Karlsson et al. |
| 2014/0243757 A1 | 8/2014 | Dasbach et al. |
| 2014/0276568 A1* | 9/2014 | Worden ............... G09B 23/285 434/262 |
| 2014/0330214 A1 | 11/2014 | Olson |
| 2015/0235571 A1 | 8/2015 | Alexandersson |
| 2016/0335920 A1 | 11/2016 | Bendek et al. |
| 2017/0352293 A1* | 12/2017 | Baker .................. G09B 23/285 |
| 2018/0315345 A1* | 11/2018 | Daniel .................. G09B 23/285 |
| 2019/0262542 A1 | 8/2019 | Row et al. |

FOREIGN PATENT DOCUMENTS

| | | |
|---|---|---|
| TW | M516983 U | 2/2016 |
| WO | 2011151315 A1 | 12/2011 |
| WO | 2013130973 A1 | 7/2013 |
| WO | 2014056868 A1 | 4/2014 |
| WO | 2015110327 A1 | 7/2015 |

\* cited by examiner

AUTOMATIC INJECTION TRAINING DEVICE

CROSS REFERENCE TO RELATED APPLICATIONS

The present application is a continuation of U.S. application Ser. No. 16/083,006, filed Sep. 7, 2018, which is a U.S. National Phase application pursuant to 35 U.S.C. § 371 of International Application No. PCT/EP2017/051386 filed Jan. 24, 2017, which claims priority to Swedish Patent Application No. 1650306-2 filed Mar. 7, 2016. The entire disclosure contents of these applications are hereby incorporated by reference into the present application.

TECHNICAL FIELD

The present invention relates to automatic injection training devices, i.e. educational appliances or dummies to train individuals in the administration of medication by means of automatic injection devices. More specifically, the present invention relates to a reloadable training device that simulates the different steps during a simulated injection process.

BACKGROUND

Automatic injection devices for delivering active substances are well known in the art. In many cases, training versions of such devices are required for showing potential users (e.g., patients or healthcare providers) how a device should be employed and for illustrating the advantages of the device. Such devices are frequently called "promotion" or "training" devices. The devices should mimic the function of different steps corresponding to a real injection device, but should not be capable of injecting an active substance.

Document U.S. Pat. No. 5,071,353 describes a training device for an automatic injector. The device comprises a cylindrical outer sleeve in the rear position of which a discharge mechanism is connected. The discharge mechanism comprises a plunger, a coil spring which acts on the plunger, a locking device, and a safety element. However, this device does not provide means allowing an accurate simulation of the resistance acting on the discharge mechanism of a regular injection device when an active substance is ejected.

WO 2011/151315 discloses a training cartridge for a drug delivery device as well as a method for resetting the cartridge. The cartridge comprises a body of substantially cylindrical shape, a piston that is slidably disposed in the body in an axial direction, and a closure means disposed at an axial end portion of the body. The piston and the closure means confine an interior volume coupled to the exterior via at least one fluid escape channel. According to the method disclosed, several steps are required for resetting the cartridge.

SUMMARY

The aim of the present invention is to obtain an improved automatic injection training device that simulates different steps during a simulated injection process.

This aim is solved according to the present invention by a medicament delivery device according to the features of the independent patent claim.

Preferable embodiments form the subject of the dependent patent claims.

According to a main aspect of the invention it is characterised by an automatic injection training device that is reliable and easy to use when mimicking the function of different steps corresponding to a real injection device. This is achieved by an automatic injection training device comprising: an elongated housing having a distal and an opposite proximal end and extending along a longitudinally axis (L); a tubular demo container axially and rotationally fixed relative to the elongated housing and having a tubular wall extending along the longitudinally axis (L); a reloadable plunger assembly comprising a plunger which is movable in the demo container between a first and a second position, and a first energy accumulating element configured to move the plunger from the first to the second position; an actuation assembly configured to hold the plunger in the first position and to release the plunger from the first position. A first signal generating element is releasably connected to the plunger and a second signal generating element is fixedly connected to the plunger, wherein each signal generating element is configured to interact independently from each other for generating audible feedback signals.

According to another aspect of the invention the first signal generating element of the training device is configured to move axially together with the plunger a predetermined distance D1 between a proximal end surface of the first signal generating element and a distal end surface of the demo container when the plunger is released from the first position, and configured to be released from the plunger when the proximal end surface of the first signal generating element impacts with the distal end surface of the demo container causing a first audible feedback signal which simulates the start of an injection phase.

In an embodiment of the invention the automatic injection training device's second signal generating element is fixedly connected to the proximal end of the plunger and configured to impact a distally directed surface of the elongated housing when the plunger reaches the second position causing a second audible feedback signal which simulates the end of an injection phase.

In a further embodiment of the invention the training device's first position is defined by a predetermined distance D2 between the proximal end of the second signal generating element and the proximal surface of the demo container or the proximal surface of the elongated housing; and the second position is defined by the abutment between the proximal end of the second signal generating element and the proximal surface of the demo container or the proximal surface of the elongated housing.

According to embodiments of the invention, the plunger comprises a friction element configured to interact with the tubular wall of the demo container such that when the plunger is released from the first position, a frictional resistive force between the friction element and the tubular wall of the demo container causes the plunger to be moved with a uniform speed and resistance simulating an injection phase of a medicament delivery.

The tubular wall and the friction element of a further embodiment of the invention are configured to be released from each other a predetermined distance before the plunger reaches the second position causing the movement of the plunger to be accelerated.

In another embodiment the actuation assembly comprises an actuator which is fixedly connected to the elongated housing and a resilient portion with a first segment, a second segment, and a tapering segment between the first segment and the second segment, and an annular inwardly directed ledge.

The first signal generating element of the invention comprises flexible tongues having an annular inwardly directed ledge, wherein the plunger comprises an annular groove having a mutual shape as that of the ledge of the actuator and as that of the ledge of the first signal generating element so that the annular inwardly directed ledge of the actuator and the radial inwardly directed ledge of the first signal generating element fit into the annular groove.

The actuation assembly in another embodiment of the invention, comprises an actuator sleeve that is coaxial and slidably arranged in relation to the actuator and operationally associated with a second energy accumulating element such that, the actuator sleeve is axially moveable in relation to the actuator towards the distal end from an initial position to a retracted position against an axial force from said second energy accumulating element.

In another embodiment, the movement of the plunger towards the proximal end of the device is substantially inhibited by the inwardly directed ledge of the actuator situated in the annular groove of the plunger, and by the actuator sleeve which overlaps at least part of the second segment and inhibits the resilient portion from moving in a radial outward direction when the actuator sleeve is in the initial position.

The automatic injection training device's actuation assembly further comprises a needle cover that is operationally associated with the actuator sleeve and has a proximal portion that extends from the proximal end of the elongated housing.

In a further embodiment the needle cover is connected to a third energy accumulating element which urges the needle cover towards the proximal end such that the proximal portion of the needle cover protrudes from the proximal end of the elongated housing. The plunger may be also axially moveable in relation to the elongated housing towards the distal end from the second position to the first position against the axial force from the first energy accumulating element.

According to yet another aspect of the invention, the assembly of the automatic injection training device comprises an assembly with a reload cap unit. The reload cap unit comprises a removable proximal cap having a shaft element that is configured for being introduced into the elongated housing assembly through a proximal opening of the needle cover. The assembly may further comprise a removable proximal cap having a first portion with a cup-shaped structure that is configured to accommodate and/or guide the proximal portion of the needle cover that extends from the proximal end of the elongated housing and that is configured to bear against an abutment surface of the elongated housing assembly when the device is reloaded.

The automatic injection training device according to the present invention presents a number of advantages. There is a high degree of functionality and automation, which removes unnecessary components and actions for injection simulation.

In addition to the visual and/or tactile information of the device according to the invention, the device provides at least three recognisable and distinctly audible signals during the injection training performance improving the simulation.

These and other aspects of and advantages with the present invention will become apparent from the following detailed description and from the accompanying drawings.

BRIEF DESCRIPTION OF THE FIGURES

In the following detailed description of the invention, reference will be made to the accompanying drawings, of which.

DETAILED DESCRIPTION

In the present application, when the term "distal part/end" is used, this refers to the part/end of an automatic injection training device, or the parts/ends of the elements thereof, which is/are located the furthest away from the medicament delivery site of the patient. Correspondingly, when the term "proximal part/end" is used, this refers to the part/end of the automatic injection training device, or the parts/ends of the elements thereof, which, is/are located closest to the medicament delivery site of the patient.

Figure 1:
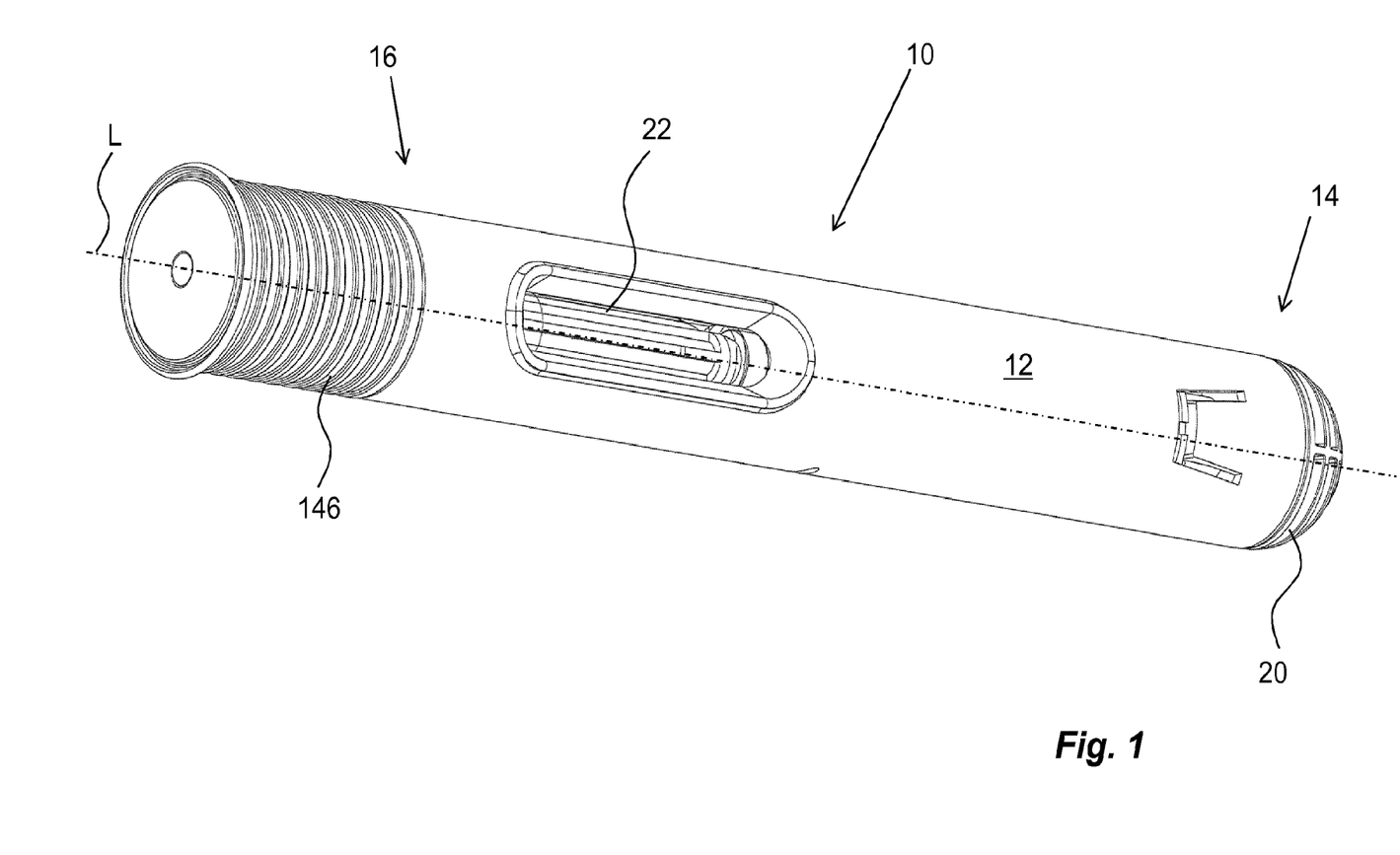
FIG. 1 shows a perspective view of one embodiment according to the present invention disclosing an automatic injection training device.
Figure 2:
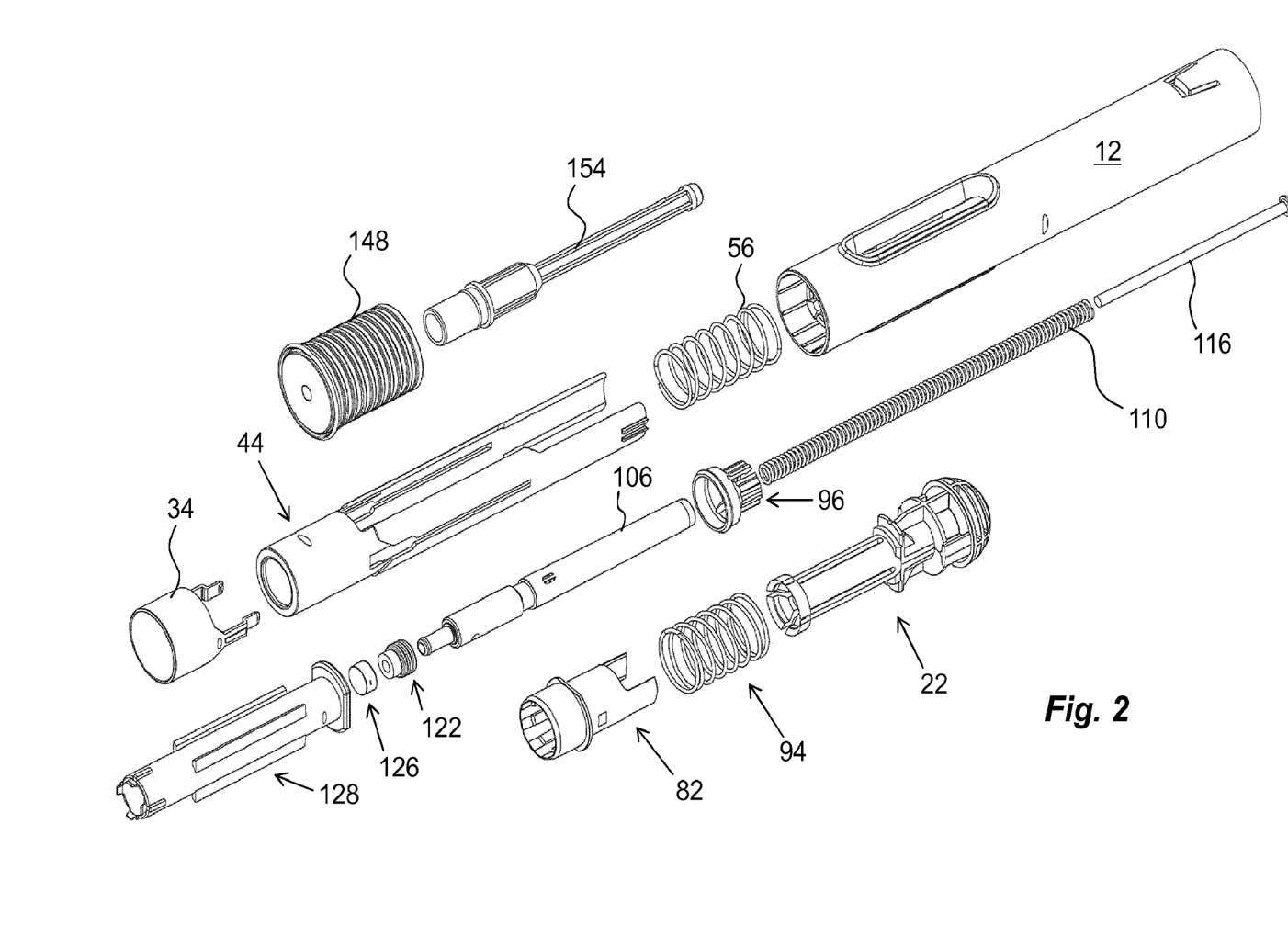
FIG. 2 illustrates an exploded perspective view of the components of the embodiment according to FIG. 1, FIGS. 3a, b show cross-sectional views of the training device of FIG. 1, FIGS. 4 to 12 show detailed views of components comprised in the embodiment of FIG. 1, and FIGS. 13 to 18 show cross-sectional views of different operational states of the embodiment of FIG. 1.
Figures 4, 5:
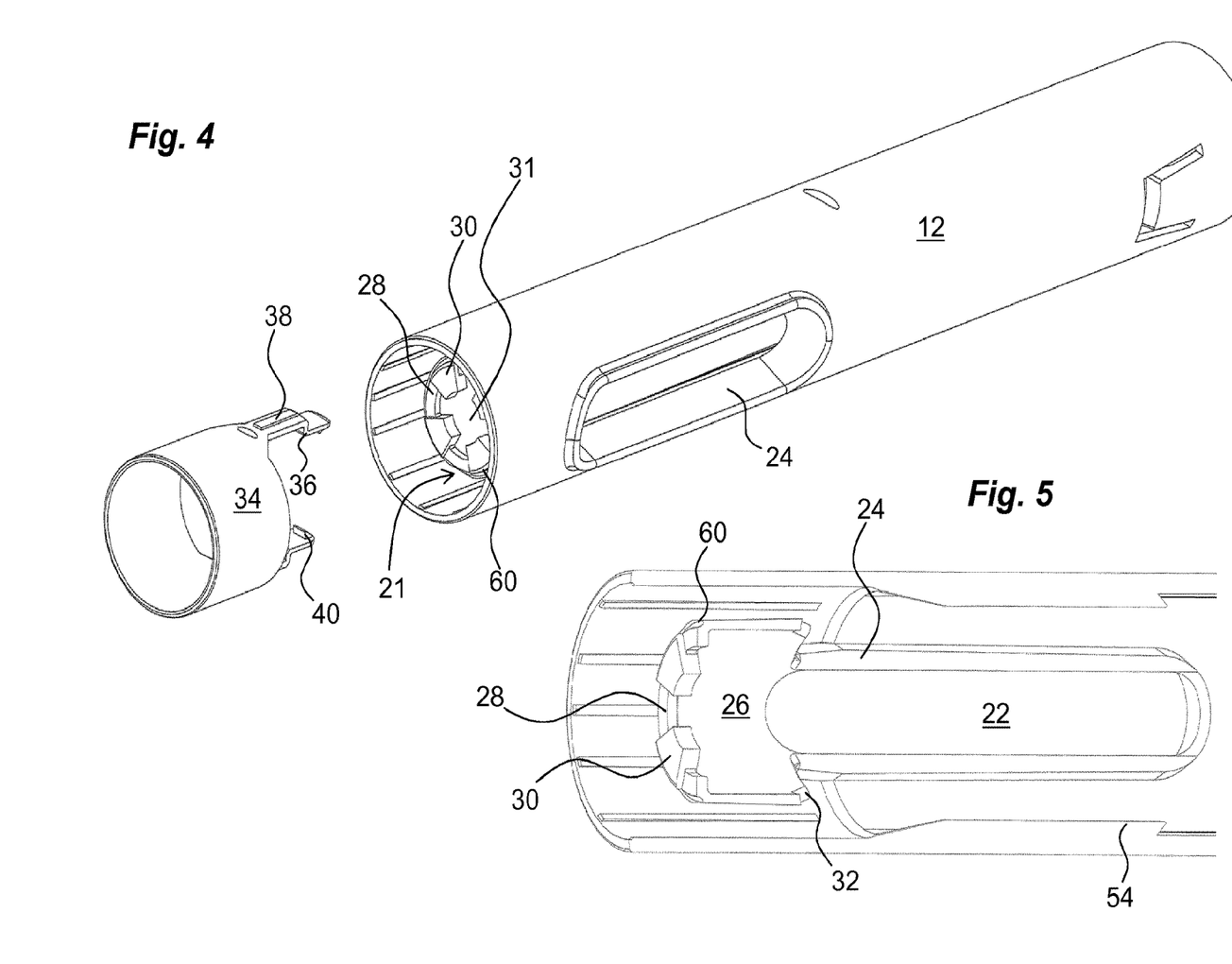

In FIG. 1 is shown an automatic injection training device 10 according to the present invention. The automatic injection training device 10 according to the present invention may comprise an elongated housing 12 having a distal end 14 and a proximal end 16. The training device further comprises a cap 20 at the distal end of the housing. The housing extends along a longitudinal axis L and is provided with a central passage 21 in the proximal end; FIG. 4. The elongated housing 12 may also comprise two oppositely positioned inspection windows 22 for assessing visually the current state of the injection training device. Each inspection window 22 is arranged with an inwardly directed wall section 24 around its circumference, FIG. 4. Further the housing 12 is arranged with a generally tubular attachment element 26, FIG. 5, which is integrated with a proximal area of the wall sections 24. The proximal end of the attachment element 26 is provided with a circumferential ledge 28 and on the circumferential ledge 28 radially inwardly directed tongues 30 are arranged, where the radially inner surfaces of the tongues 30 form a circular passage 31 as seen in FIGS. 4 and 5. The distal edge of the attachment element 26 is provided with cut-outs 32, the function of which will be explained below.

Figure 8:
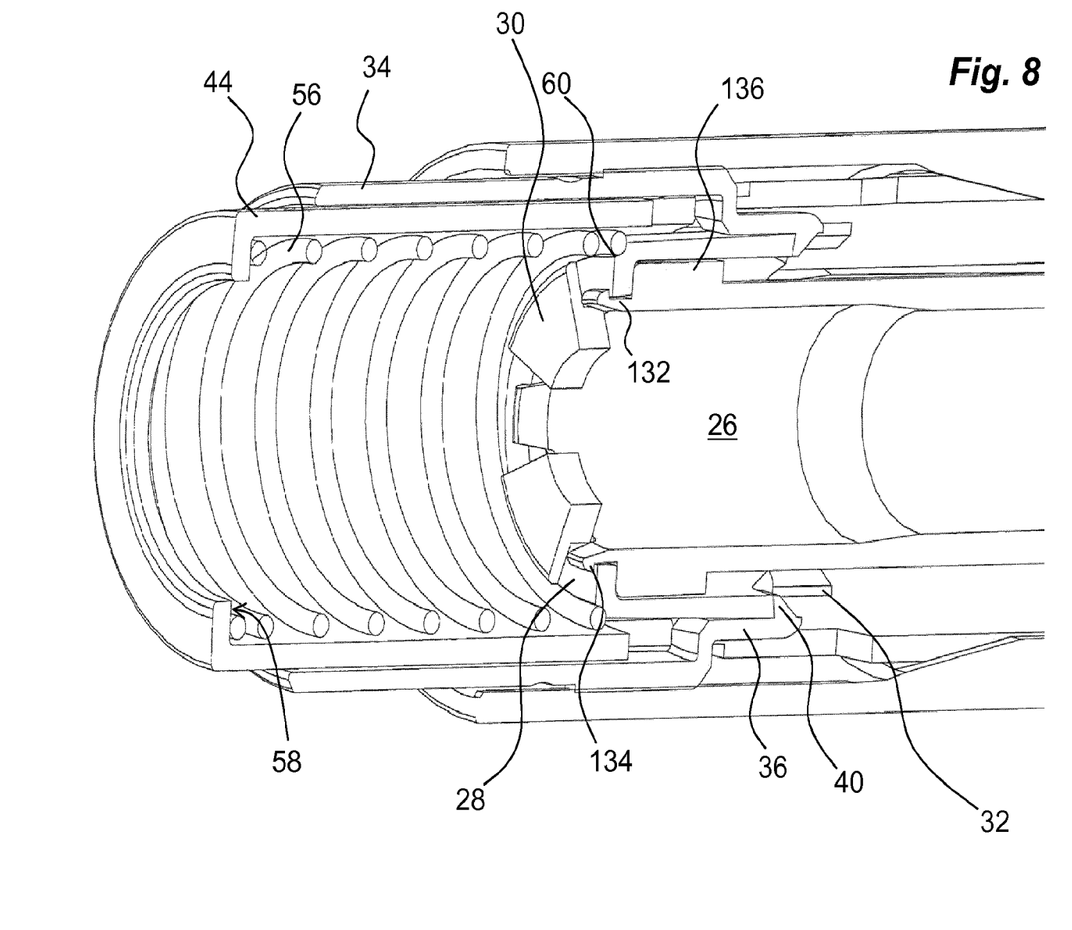

The proximal end of the housing is further arranged with a generally tubular medicament delivery element guard guide 34, FIG. 4. The medicament delivery element guard guide 34 has an outer diameter generally corresponding to the inner diameter of the housing 12 and is provided with distally directed arms 36. The outer surfaces of the arms are arranged with longitudinally extending ribs 38. The free ends of the arms 36 are provided with inwardly directed ledges 40. When the medicament delivery element guard guide 34 is attached to the housing, a distal part extends into the proximal end of the housing and the ledges 40 of the arms 36 fit into the cut-outs 32 of the attachment element 26 as seen in FIG. 8.

Figures 6, 7:
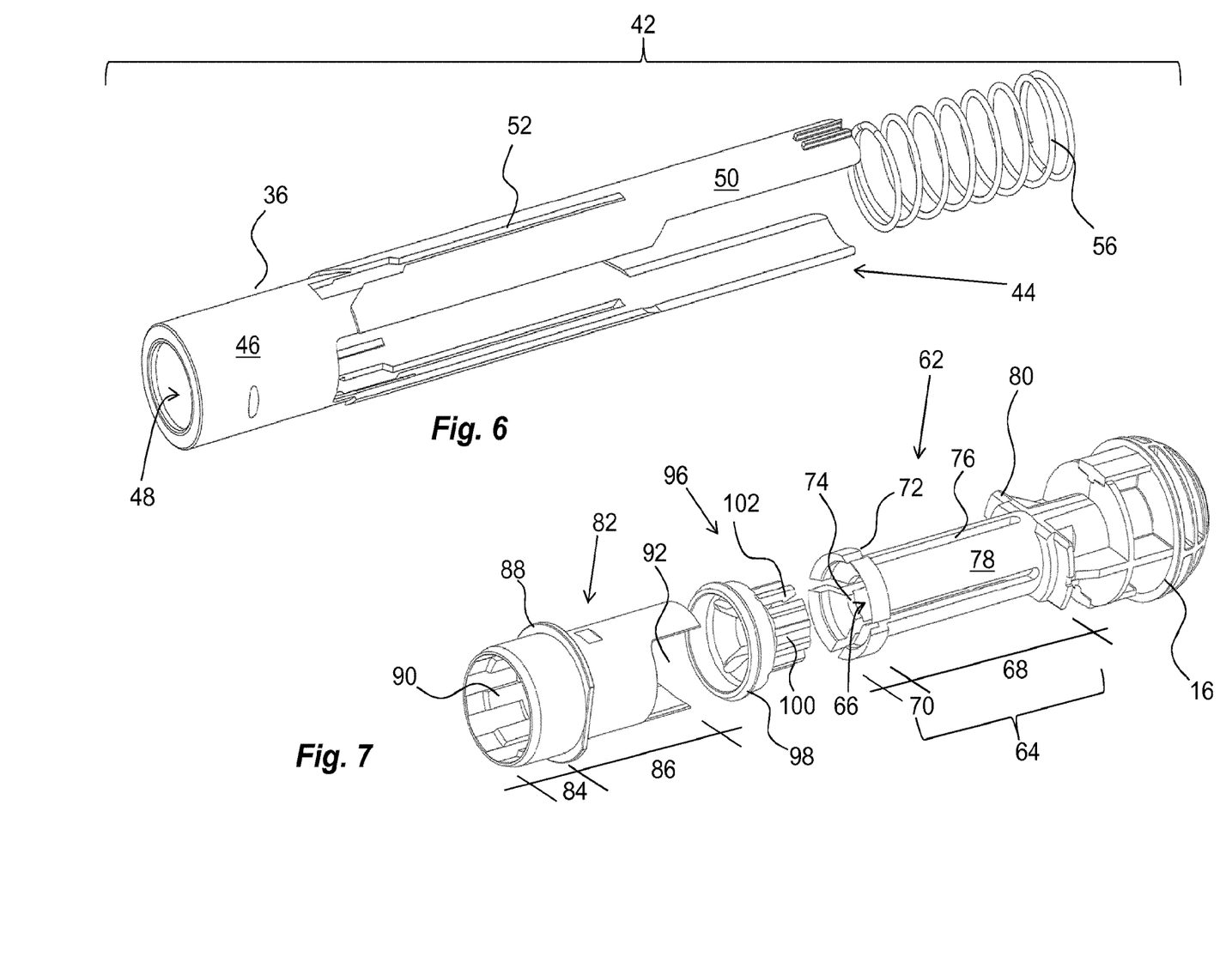

The injection training delivery device is further arranged with an actuation assembly 42, FIG. 6, that comprises a medicament delivery element guard 44 arranged slidable in the longitudinal direction inside the housing. The medicament delivery element guard 44 has a generally tubular proximal part 46. The proximal end of the medicament delivery element guard 44 is arranged with a central passage 48. The medicament delivery element guard 44 is arranged with two distally extending arms 50. The arms 50 are provided with longitudinal grooves 52 where a proximal part of the grooves 52 have a width where the free ends of the arms 36 of the medicament delivery element guard guide 34 fit into. The ribs 38 of the medicament delivery element guard guide 34 will then slide in the grooves 52 as the medicament delivery element guard 44 moves as will be described. The grooves 52 are further designed to interact with longitudinal ribs 54 on the inner surface of the housing, FIG. 5, where a distal end of the ribs 54 will act as a stop in the proximal direction of the medicament delivery element guard 44 when a distal end wall of the groove 52 is moved in contact with the rib 54. The interaction between the ribs 54 and the grooves 52 further cause a rotational lock between the medicament delivery element guard 44 and the housing. The medicament delivery element guard 44 is further provided with a spring 56, hereafter named medicament delivery element guard spring, acting on a distally directed surface 58 around the central passage 48 and a seat 60 surrounding the inwardly directed ledges 30 as seen in FIGS. 5 and 8.

The actuation assembly 42 further comprises an actuator 62, FIG. 7, comprising a generally tubular proximal part 64 having central opening 66 extending along the longitudinal axis L. The tubular proximal part is arranged with a first segment 68 having a first outer diameter, a second segment 70 having a second outer diameter, and a tapering segment 72 between the first segment 68 and the second segment 70, and an annular inwardly directed ledge 74. The tubular proximal part 64 is further arranged with a number of longitudinally extending slits 76, thereby forming a number of generally radially flexible arms 78. The distal end of the actuator 62 is arranged with radially outwardly extending ledges 80 and the distal cap 16.

The actuation assembly 42 further comprises a generally tubular actuator sleeve 82 having a proximal end part 84, a distal end part 86 and a collar 88 between the proximal end part 84 and distal end part 86. On the inner surface of the actuator sleeve 82, equidistant longitudinally extending ribs 90 are arranged and cut-outs 92 are arranged on the distal end part 86, FIG. 7. The actuator sleeve 82 is coaxial and slidably arranged in relation to the actuator 62. A compression spring 94, FIG. 3b, hereafter named actuator sleeve spring, is arranged between proximally directed surfaces of the ledges 80 of the actuator 62 and a distally directed surface of the collar 88 of the actuator sleeve 82 as will be described. Further, a first signal generating element 96 is arranged, FIG. 7. It comprises a generally tubular body 98 provided with a number of distally directed arms 100. The free ends of the arms 100 are arranged with radially inwardly directed ledges 102, the function of which will be described below.

Figures 9, 12:
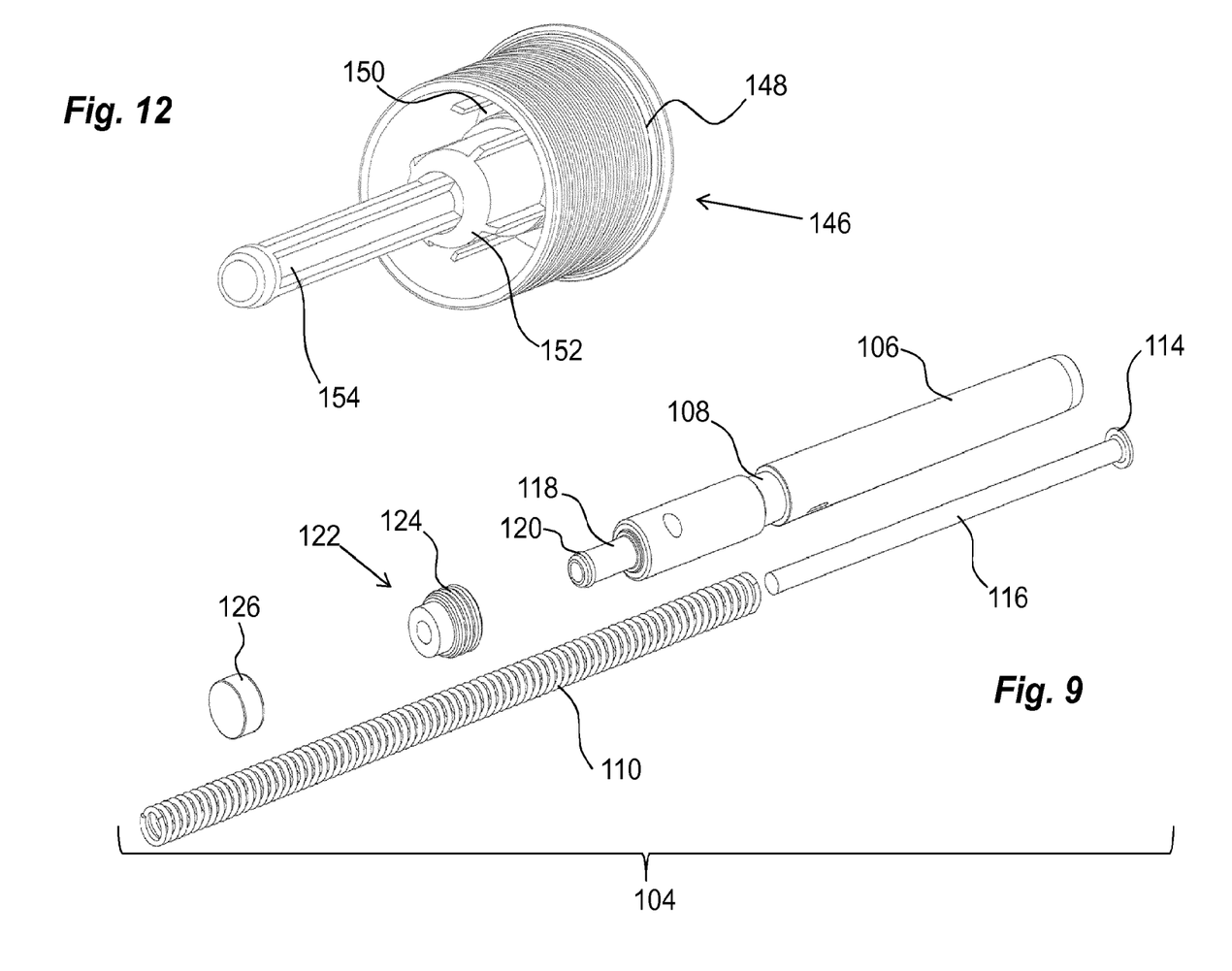

The device further comprises a reloadable plunger assembly 104, FIG. 9, comprising a plunger rod 106. The plunger rod 106 is arranged with a circumferential groove 108 in which the inwardly directed ledges 74 of the actuator 62 fit. Also the inwardly directed ledges 102 of the first signal generating element 96 fit into the circumferential groove 108 of the plunger rod 106.

Figure 3A:
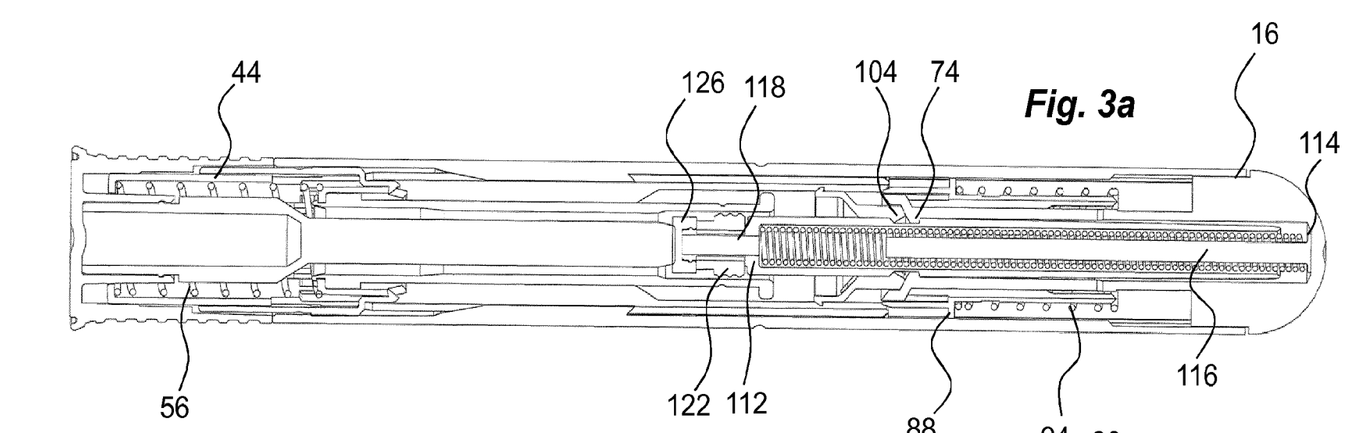
Figure 3B:
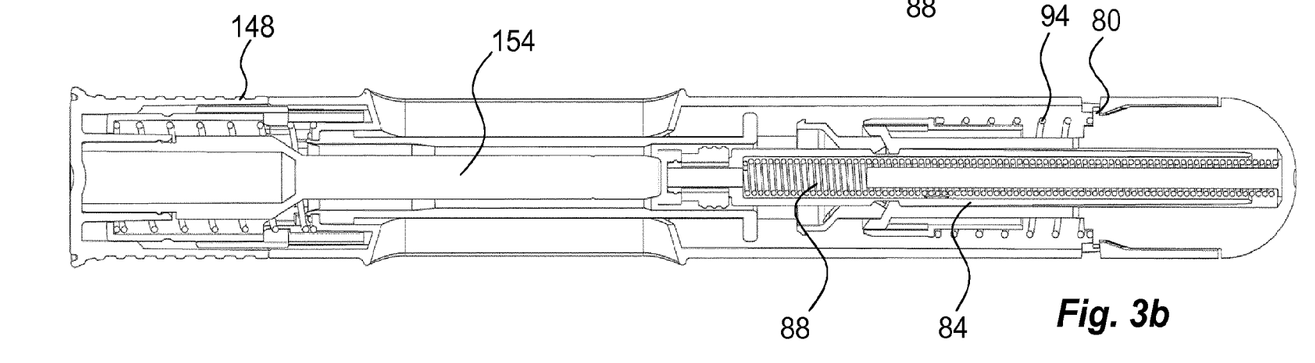

Further, the plunger rod 106 is hollow and a compression drive spring 110 is placed inside the plunger rod 106. The drive spring 110 is positioned between an end wall 112, FIG. 3, at the proximal end of the plunger rod 106 and an end disc 114 at a distal end of a spring guide rod 116. The distal end of the spring guide rod 116 is in turn abutting a proximally directed wall surface of the end cap 16 as seen in FIG. 3. The proximal end of the plunger rod 106 is arranged with a cylindrical hub 118, FIG. 9, which hub 118 is arranged with a circumferential ledge 120. On the hub 118, a friction element 122 is arranged having a number of circumferential ridges 124 on its outer surface. The friction element 122 is held in place by an end piece 126 arranged to snap-fit onto the proximal end of the hub 118 and engages with the circumferential ledge 120. The end piece 126 will act as a second signal generating element as will be described.

Figure 10:
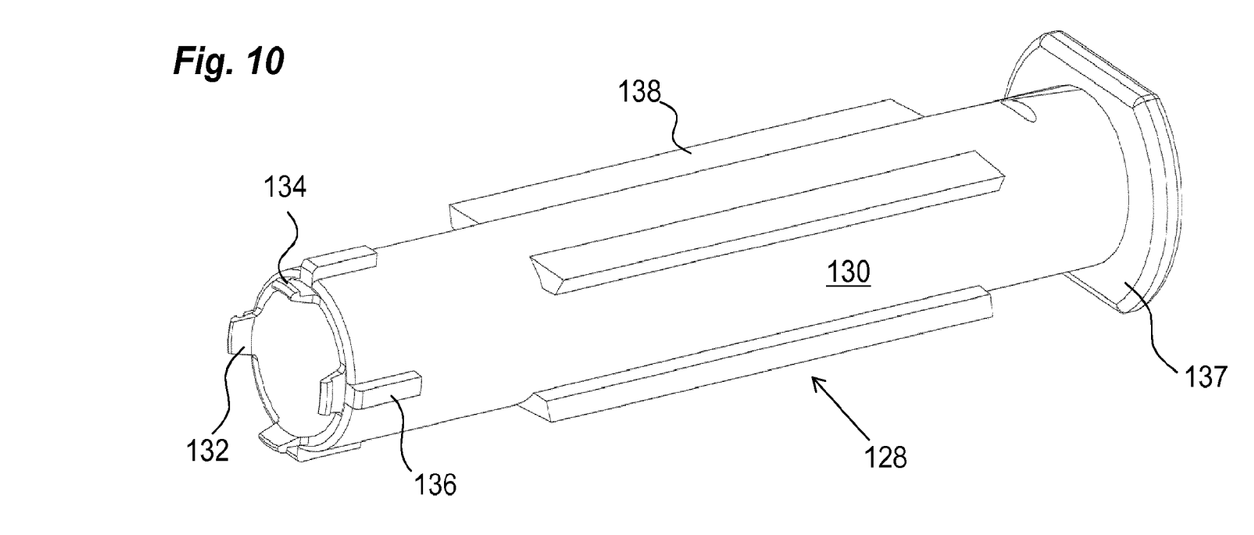
Figure 11:
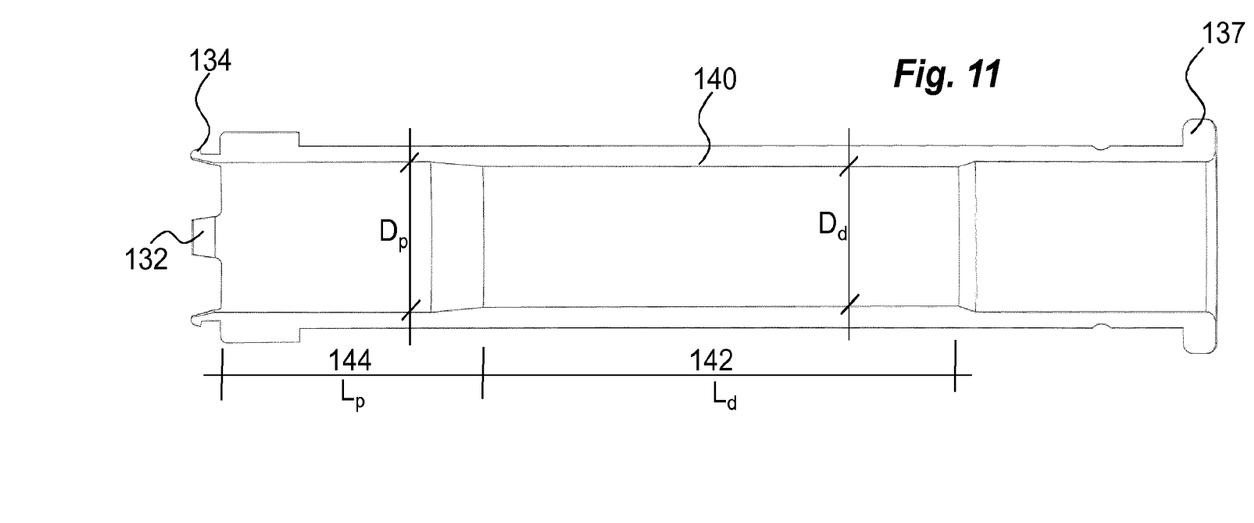

The plunger assembly 104 is arranged to cooperate with a tubular demo container 128, FIGS. 10 and 11, which is intended to simulate a medicament container in a real medicament delivery device. The demo container 128 may comprise a tubular body 130 having a proximal end surface provided with a number of proximally extending arms 132, which arms 132 are arranged with radially outwardly directed protrusions 134. On the side surface adjacent the arms 132 longitudinally extending ledges 136 are arranged. The demo container 128 is arranged to be connected to the housing such that the arms 132 at the proximal end fit between the inwardly directed ledges 30 with the protrusions 134 gripping around the circumferential ledge 28, FIG. 8, and with the longitudinal ledges 136 abutting the distally directed surfaces of the circumferential ledge 28, thereby fixating the demo container 128 to the housing. Further the distal end of the demo container 128 is arranged with an annular flange 137 having a distal end surface. Longitudinally extending ribs 138 are arranged on the tubular body 130 for guiding the demo container 128 into the housing during assembly and for preventing rotation of the container in relation to the housing. The demo container 128 further comprises an inner tubular wall 140. The tubular wall 140 extends along the longitudinal axis L and is divided in two predetermined length portions. A distal section 142 has a predetermined distal length $L_d$ and a predetermined distal diameter $D_d$, and a proximal section 144 has a predetermined proximal length $L_p$ and a predetermined proximal diameter $D_p$. The predetermined distal length La of the distal section 142 is larger than the predetermined proximal length $L_p$ of the proximal section 144 and the predetermined proximal diameter is larger than the predetermined distal diameter Da as seen in FIG. 11.

The injection training device further comprises a reload cap unit 146, FIG. 12, comprising a generally tubular cap 148 arranged to fit onto a proximal end of the housing with a friction fit. The cap is arranged with an end wall 150 having a central tubular post 152. A plunger 154 is attached to the central post 152. The function of the reload cap unit 146 will be described below.

The injection training device is intended to be used as follows. When provided to the user, the plunger rod 106 is in the distal position with the drive spring 110 tensioned as seen in FIG. 3. The plunger rod 106 is held in this tensioned position by the flexible arms 78 of the actuator 62 fitting into the circumferential groove 108 of the plunger rod 106. The flexible arms 78 are prevented from releasing the plunger rod 106 by the actuator sleeve 82 being in contact with outer surfaces of the flexible arms 78 with the proximally directed end surfaces of its longitudinal ribs 90 abutting the tapering section 72 of the flexible arms 78, thereby preventing movement of the actuator sleeve 82 in the proximal direction by the force of the actuator sleeve spring 94. The ledges 102 of the arms 100 of the first signal generating element 96 are also positioned in the circumferential groove 208 of the plunger rod and held in place by the flexible arms 78 of the actuator as seen in FIG. 3. The proximal end is arranged with the cap 148 of the reload cap unit 146 attached and the plunger 154 placed inside the demo container as seen in FIG. 3.

Figure 13:
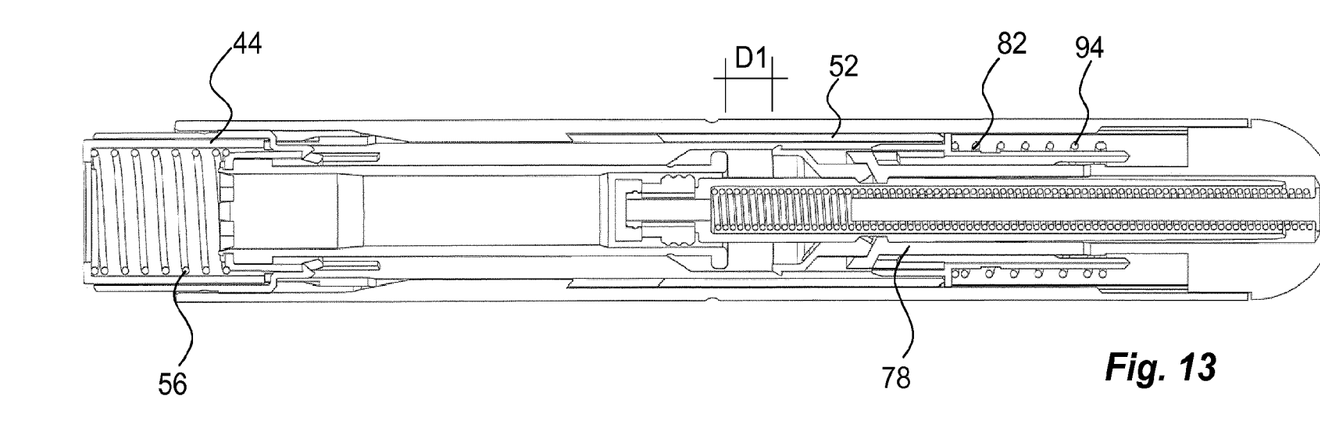
Figure 14:
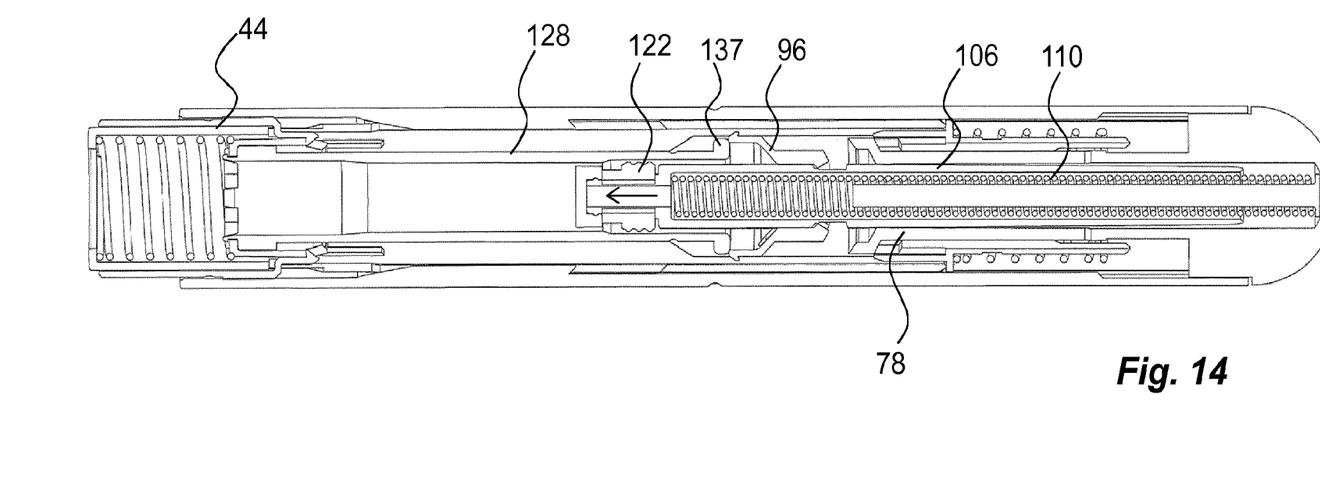

When the injection training device is to be used, the reload cap unit 146 with its plunger 154 is removed from the proximal end of the device. The proximal end of the device is then pressed against an intended dose delivery site. This causes the medicament delivery element guard 44 to be moved in the distal direction in relation to the rest of the device, FIG. 13, tensioning the medicament delivery element guard spring 56. After a certain distance, distally directed end surfaces of the arms 52 of the medicament delivery element guard 44 come in contact with proximally directed surfaces of the circumferential collar 88 of the actuator sleeve 82. The actuator sleeve 82 is then moved in the distal direction in relation to the device, tensioning the actuator sleeve spring 94, until the actuator sleeve 82 is moved out of contact with the flexible arms 78 of the actuator 62, FIG. 13. The flexible arms 78 are then free to move out of engagement with the circumferential groove 108 of the plunger rod 106, which in turn causes the plunger rod 106 to move in the proximal direction due to the force of the drive spring 110. The first signal generating element 96 also moves axially together with the plunger rod 106 a predetermined distance D1 until the first signal generating element 96 is released from the plunger rod 106 when the proximal end surface of the first signal generating element 96 impacts with the distal end surface of the flange 137 of the demo container 128, FIG. 14, causing a first audible feedback signal which simulates the start of an injection phase. The impact results in a distinct click which indicates to the user that the first phase of the injection has been simulated. When the plunger rod 106 is moved in the proximal direction, the inwardly directed ledges 74 of the flexible arms 78 of the actuator 62 will be in contact with the outer surface of the plunger rod 106, thereby bending the flexible arms 78 radially outwardly.

Figure 15:
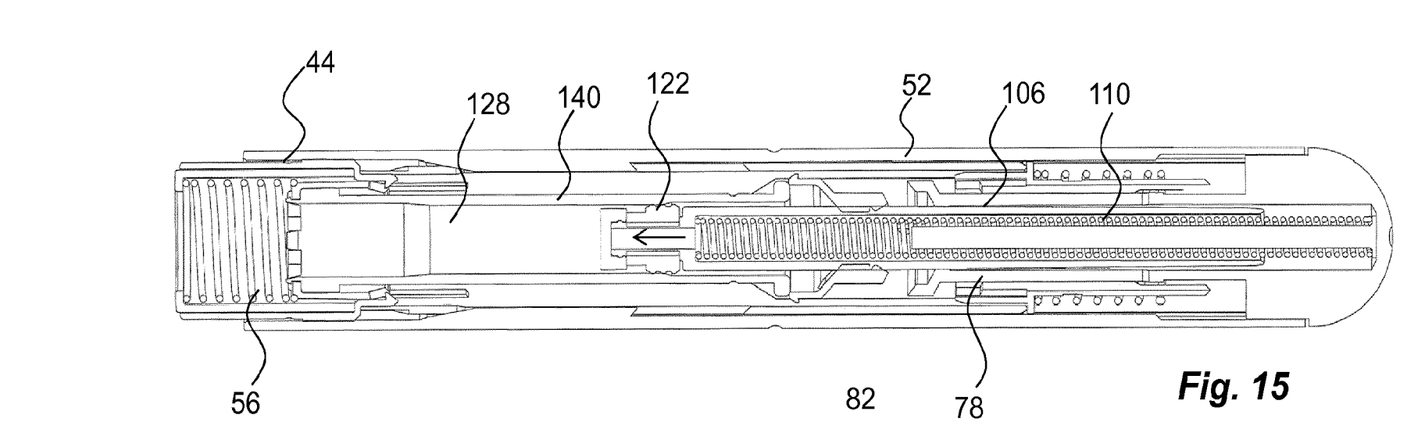
Figure 16:
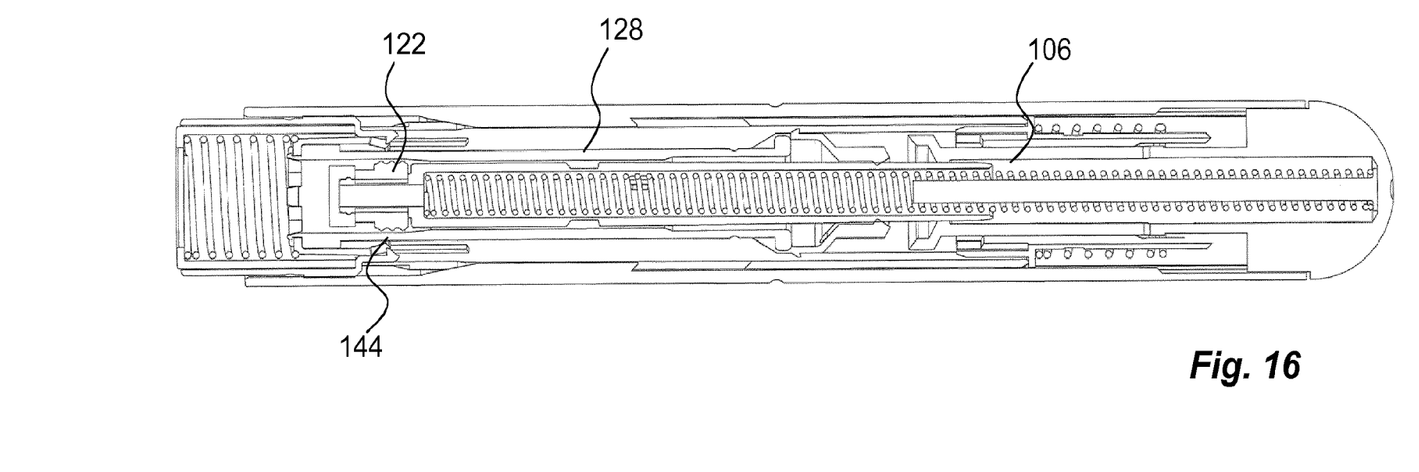
Figure 17:
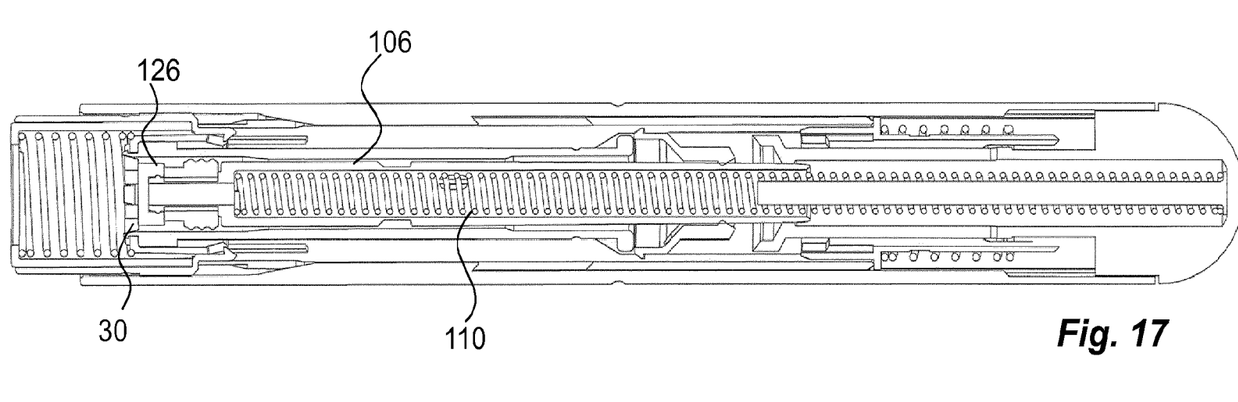

The plunger rod 106 continues in the proximal direction wherein the friction element 122 interacts with the distal section 142 of the tubular wall of the demo container 128, FIG. 15, such that a frictional resistive force between the friction element 122 and the tubular wall 140 of the demo container 128 causes the plunger rod 106 to be moved with a uniform speed and resistance simulating an injection phase of a medicament delivery. When the friction element 122 reaches the proximal section 144, FIG. 16, the resistive force is greatly reduced or even removed, whereby the plunger rod 106 is accelerated until the second signal generating element 126 impacts the distal surfaces of the tongues 30 of the housing, FIG. 17, causing a second audible feedback signal which simulates the end of an injection phase.

Figure 18:
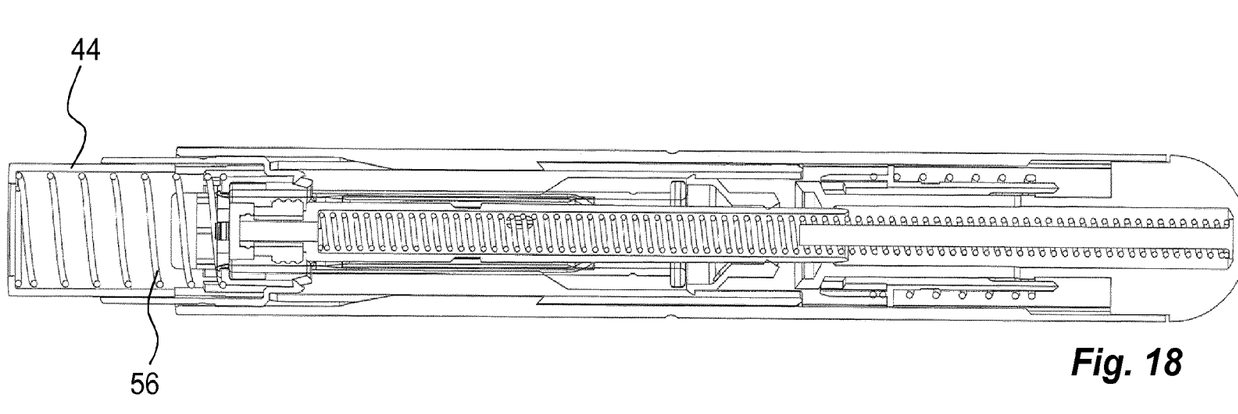

The injection training device is then removed from the injection site and the medicament delivery element guard 44 is extended in the proximal direction due to the force of the needle cover spring 56, FIG. 18. However, the actuator sleeve 82 cannot move in the proximal direction by the actuator sleeve spring 94 due to the outwardly bent flexible arms 78 of the actuator 62 blocking the movement. The reload cap unit 146 is now attached to the proximal end of the training device by entering the plunger 154 into the central passage 48 of the medicament delivery element guard. The end surface of the plunger 154 is brought in contact with the second signal generating element 126 of the plunger rod 106. The plunger rod 106 and the plunger 154 will be moved in the distal direction against the axial force of the drive spring 110. During the movement, the inwardly directed ledges 102 of the arms 100 of the first signaling element 96 will enter the circumferential groove 108 of the plunger rod 106. At the end of the movement of the plunger rod 106 in the distal direction, the inwardly directed ledges 74 of the flexible arms 78 of the actuator 62 will also enter the circumferential groove 108 of the plunger rod 106. The actuator sleeve 82 is now free to move in the proximal direction due to the force of the actuator sleeve spring 94 to its initial position wherein the proximally end surfaces of the longitudinal ribs 90 come in contact with the tapering segment 72 of the flexible arms 78, thereby again blocking the flexible arms 78 of the actuator 62 as seen in FIG. 3. The injection training device reload process is finished and the device is ready for training injection again.

Furthermore, in the claims, the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. Any reference signs in the claims should not be considered as limiting the scope.

It is however to be understood that embodiments described above and shown in the drawings are to be regarded only as non-limiting examples of the present invention and that may be modified within the scope of the appended patent claims.

The invention claimed is:
1. A signal generating mechanism comprising:
a housing having an inner surface;
a plunger rod having a groove on an outside surface and slidably positioned within the housing to axially move from a first position to a second position;
a first signaling generating element comprising inward directed ledges that are engaged with the groove when the plunger rod is in the first position;
a second signal generating element that is connected to the plunger rod,
wherein the first and second signaling elements both move axially and proximally with the plunger rod as the plunger rod moves from the first position to the second position,
wherein the inward directed ledges of the first signaling element disengage from the groove after the plunger rod has moved from the first position but before the plunger rod reaches the second position, where after disengagement from the plunger rod the first signaling element cause a first feedback signal to be emitted,
wherein a second feedback signal is emitted after the first feedback signal is emitted and when the plunger rod has reached the second position.
2. The signal generating mechanism of claim 1 further comprising an actuation assembly that holds the plunger rod in the first position and holds the directed ledges within the groove as the plunger rod moves from the first position to the second position.
3. The signal generating mechanism of claim 1 further comprising a medicament delivery element guard slidably positioned within the housing and having a proximal portion that extends beyond a terminal proximal end of the housing, where movement of the housing relative to the proximal portion causes the activation assembly to release the plunger rod so that is moves from the first position to the second position.

4. The signal generating mechanism of claim 1 further comprising a tubular body axially and rotationally fixed relative to the elongated housing, where the tubular body has a distal end surface.

5. The signal generating mechanism of claim 4, wherein the first feedback signal is caused by the first signaling element striking the distal end surface of the tubular body.

6. The signal generating mechanism of claim 1, wherein the second feedback signal is caused by the second signaling element striking an inner surface of the housing.

7. The signal generating mechanism of claim 1, wherein the second signal generating element remains connected to the plunger rod when striking the inner surface.

8. The signal generating mechanism of claim 1, wherein the plunger rod is hollow and has a closed proximal end surface and an open distal end.

9. The signal generating mechanism of claim 1 further comprises a first energy accumulating element positioned within the plunger rod.

10. The signal generating mechanism of claim 9, wherein the first energy accumulating element is a spring configured to move the plunger rod from the first to the second position, where a proximal end of the spring abuts the proximal end face of the plunger rod.

11. The signal generating mechanism of claim 2, wherein the actuation assembly comprises an actuator which is fixedly connected to the elongated housing.

12. The signal generating mechanism of claim 11, wherein the actuator comprises a resilient portion with a first segment, a second segment, and a tapering segment between the first segment and the second segment, and a tapering segment between the first segment and the second segment, and an annular inwardly directed ledge.

13. The signal generating mechanism of claim 11, wherein the groove has a mutual shape as that of the ledge of the actuator and as that of the ledge of the first signal generating element so that the annular inwardly directed ledge of the actuator and the radial inwardly directed ledge of the second signal generating element fit into the annular groove.

14. The signal generating mechanism of claim 11, wherein the actuation assembly comprises an actuator sleeve that is coaxial and slidably arranged in relation to the actuator and operationally associated with a second energy accumulating element such that the actuator sleeve is axially moveable in relation to the actuator towards a distal end of the housings from an initial position to a retracted position against an axial force from the second energy accumulating element.

15. The signal generating mechanism of claim 12, wherein the movement of the plunger rod towards a proximal end of the housing is substantially inhibited by the inwardly directed ledge of the actuator situated in the groove of the plunger rod, and by the actuator sleeve which overlaps at least part of the second segment and inhibits the resilient portion from moving in a radial outward direction when the actuator sleeve is in the initial position.

16. The signal generating mechanism of claim 2, wherein the actuation assembly further comprises a medicament delivery element guard that is operationally associated with the actuator sleeve and has a proximal portion that extends from a proximal end of the housing.

17. The signal generating mechanism of claim 16, wherein the medicament delivery element guard is connected to a compression spring which urges the medicament delivery element guard towards the proximal end of the housing such that the proximal portion of the medicament delivery element guard protrudes a distance from the proximal end of the housing.

18. A signal generating mechanism comprising:
a housing;
a tubular body comprising a distal end surface, where the tubular body is axially and rotatably fixed within the housing;
a plunger assembly comprising a hollow plunger rod that moves axially in a proximal direction relative to and within the housing between a first and a second position, where the plunger assembly further comprises a compression spring pre-tensioned and positioned within the hollow plunger rod such that a proximal end of the compression spring abuts a closed proximal end of the plunger rod so as to move the plunger rod from the first to the second position;
an actuation assembly configured to hold the plunger rod in the first position and to release the plunger rod from the first position; and
a first signal generating element releasably connected to the plunger rod; and
a second signal generating element fixedly connected to the plunger rod,
wherein the first signal generating element is configured to operate independently from the second signal generating element such that each signal generating element generates a separate audible feedback signal, and
wherein one audible feedback signal is generated by the first signal generating element impacting the distal end of the tubular body.

19. A signal generating mechanism comprising:
an elongated housing having an inner surface, a distal end and an opposite proximal end and extending along a longitudinal axis;
a tubular container axially and rotationally fixed relative to the elongated housing;
a plunger assembly comprising a plunger rod which is movable relative to the container and the housing between a first and a second position;
a first energy accumulating element configured to move the plunger rod from the first to the second position;
an actuation assembly configured to hold the plunger rod in the first position and to release the plunger rod from the first position;
a first signal generating element releasably connected to the plunger rod; and
a second signal generating element fixedly connected to the plunger rod,
wherein each signal generating element is configured to interact independently from each other for generating separate audible feedback signals, and
wherein notification of an end of injection is signaled when the second signal generating element impacts a fixed surface on the inner surface of the housing.

20. The signal generating mechanism of claim 19, wherein the fixed surface comprises a plurality of radially projecting tongues.

* * * * *